United States Patent
Doan et al.

(10) Patent No.: US 7,436,573 B2
(45) Date of Patent: Oct. 14, 2008

(54) ELECTRICAL CONNECTIONS IN MICROELECTROMECHANICAL DEVICES

(75) Inventors: Jonathan C. Doan, Mountain View, CA (US); Satyadev R. Patel, Palo Alto, CA (US); Robert M. Duboc, Jr., Menlo Park, CA (US)

(73) Assignee: Texas Instruments Incorporated, Dallas, TX (US)

( * ) Notice: Subject to any disclaimer, the term of this patent is extended or adjusted under 35 U.S.C. 154(b) by 267 days.

(21) Appl. No.: 11/181,079

(22) Filed: Jul. 13, 2005

(65) Prior Publication Data

US 2005/0250362 A1   Nov. 10, 2005

Related U.S. Application Data

(63) Continuation-in-part of application No. 10/365,951, filed on Feb. 12, 2003, now Pat. No. 6,952,302.

(51) Int. Cl.
*G02B 26/00* (2006.01)
*G02B 26/08* (2006.01)

(52) U.S. Cl. .................... 359/291; 359/224

(58) Field of Classification Search ......... 359/290–292, 359/223–225, 245, 260–263, 298, 198, 301–303, 359/317–318, 237, 242, 295
See application file for complete search history.

(56) References Cited

U.S. PATENT DOCUMENTS

| | | | |
|---|---|---|---|
| 4,441,791 A * | 4/1984 | Hornbeck | 359/295 |
| 5,444,566 A * | 8/1995 | Gale et al. | 359/291 |
| 5,504,614 A | 4/1996 | Webb et al. | |
| 5,552,924 A | 9/1996 | Tregilgas | |
| 5,567,334 A | 10/1996 | Baker et al. | |
| 5,604,625 A | 2/1997 | Henck | |
| 5,652,671 A | 7/1997 | Knope et al. | |
| 5,696,619 A | 12/1997 | Knope et al. | |
| 5,942,054 A | 8/1999 | Tregilgas et al. | |
| 6,163,363 A * | 12/2000 | Nelson et al. | 355/32 |
| 2002/0196524 A1 | 12/2002 | Huibers et al. | |

* cited by examiner

*Primary Examiner*—Scott J. Sugarman
*Assistant Examiner*—Dawayne A Pinkney
(74) *Attorney, Agent, or Firm*—Wade James Brady, III; Frederick J. Telecky, Jr.

(57) ABSTRACT

A micromirror device and a method of making the same are disclosed herein. The micromirror device comprises a mirror plate, hinge, and post each having an electrically conductive layer. One of the hinge, mirror plate, and post further comprises an electrically insulating layer. To enable the electrical connections between the conducting layers of the hinge, mirror plate, and post, the insulating layer is patterned.

38 Claims, 8 Drawing Sheets

ELECTRICAL CONNECTIONS IN MICROELECTROMECHANICAL DEVICES

CROSS-REFERENCE TO RELATED APPLICATIONS

This patent application is a continuation-in-part of U.S. patent application Ser. No. 10/365,951 filed Feb. 12, 2003 now U.S. Pat. No. 6,952,302, the subject matter being incorporated herein by reference in entirety.

TECHNICAL FIELD OF THE INVENTION

The present invention is related generally to the art of microelectromechanical devices, and, more particularly, to electrical connections between conductive members of the microelectromechanical devices and methods for making the same.

BACKGROUND OF THE INVENTION

Microelectromechanical systems (MEMS) are devices with characteristic dimensions of hundreds of microns or less, which integrate electrical and mechanical elements through microfabrication technology. The electrical and mechanical elements comprise electrically conductive layers on or through which external electrical signals can be applied or delivered such that operations of the electrical and/or mechanical elements can be associated with the external electrical signals. In addition to the electrically conductive layers, insulating materials are often included in the electrical and/or mechanical elements of the MEMS devices for many reasons, such as to improve mechanical properties of the mechanical elements, to prevent unwanted electrical short between the electrical and/or mechanical elements, and to comply with other particular requirements. The insulating material, however, may isolate the electrically conductive layers that are desired to be electrically connected; and in turn bringing about electrical connection difficulties to the MEMS devices.

As a way of example, reflective and deflectable micromirror devices are a type of MEMS device. A typical micromirror device comprises a deflectable and reflective mirror plate attached to a deformable hinge that is held by a post on a substrate such that the mirror plate is capable of being deflected relative to the substrate under an electrostatic force. The electrostatic force is derived from an electrostatic voltage differences between the mirror plate and an addressing electrode associated with and placed proximate to the mirror plate. To enable applications of voltage on the mirror plate, the mirror plate, deformable hinge, and post comprise electrically conductive layers that are desired to be connected together. However, the electrically conductive layers may be electrically isolated by insulating layers that are necessary to comply with specific requirements. For example, an electrically insulating layer may be desired to improve the mechanical properties of the mirror plate, the hinge, and the post. An electrically insulating layer may also be desired to prevent potential diffusion, especially between sacrificial materials and layers of the functional elements of the micromirror device. Because of the electrical isolation of the electrically conductive layers, electrical signals (voltages) are not be able to be delivered to or applied on the target elements, such as the mirror plate of the micromirror devices.

Therefore, what is needed is a method and apparatus for enabling electrical connections between electrical conductive layers that are desired to be electrically connected in the MEMS devices.

SUMMARY OF THE INVENTION

In view of the foregoing, the present invention discloses a MEMS device having electrically conductive and insulating layers. To enabling the electrical connection between the electrically conductive layers that are desired to be electrically connected, the insulating layers therebetween are patterned to enable such electrical connection. As an exemplary implementation in a micromirror device, the insulating layers between the electrically conductive layers of the mirror plate and deformable hinge, if any, are patterned in a way such that the deformable hinge and mirror plate are electrically connected. When an insulating layer is fabricated between the electrically conductive layers of the hinge and hinge support, such insulating layer is patterned to enable the electrical connection between the hinge and hinge support. The same patterning is applied to the electrically insulating layers between the hinge support and post if any.

In one example of the invention, a method of making a micromirror device is disclosed herein. The method comprises: depositing first and second sacrificial materials on a substrate; forming a reflective mirror plate on one of the two sacrificial materials; forming a deformable hinge and a post on the other sacrificial material, further comprising: depositing an electrically insulating layer; patterning the electrically insulating layer; depositing and patterning an electrically conductive layer; and wherein the electrically insulating layer is patterned such that the electrically conductive layer is electrically connected to the reflective mirror plate; and removing the first and second sacrificial materials so as to free the deflectable mirror plate. In this example, the substrate can be a light transmissive substrate. Alternatively, the substrate can be a standard semiconductor substrate on which integrated circuits can be fabricated.

In another example, a micromirror device is disclosed. The device comprises: a substrate; a post one the substrate; a deformable hinge connected to the post and held by the post on the substrate; a mirror plate attached to the deformable hinge such that the mirror plate is capable of rotating relative to the substrate; and wherein the mirror plate comprises an electrically conductive layer that is electrically connected to an electrically conductive layer of the post via an electrically conductive layer of the hinge, such that an external power source can be connected to the electrically conductive layer of the mirror plate via the electrically conductive layers of the post and deformable hinge.

In yet another example, a method of fabricating a micromirror device is disclosed. The method comprises: depositing first and second sacrificial layers on a substrate; forming a reflective mirror plate on one of the first or second sacrificial layers; forming a deformable hinge on the other sacrificial layer, the hinge forming comprising: forming a hinge that has a first hinge layer that is electrically insulating and a second hinge layer that is electrically conducting, wherein the first hinge layer is disposed between the second hinge layer and the reflective mirror plate; and wherein the first hinge layer is patterned such that at least a portion of the second hinge layer is electrically connected to the reflective mirror plate; and removing the first and second sacrificial layers so as to free the mirror plate.

In yet another example, a micromirror device is disclosed. The device comprises: a substrate; a post on the substrate, the post comprising an electrically conductive post layer; a deformable hinge held by the post on the substrate, the hinge comprising an electrically conductive hinge layer and an electrically insulating layer, wherein the electrically conductive hinge layer is electrically connected to the electrically conductive post layer of the post; and a reflective and deflectable mirror plate attached to the deformable hinge such that the mirror plate is capable of rotating relative the substrate, said mirror plate comprising an electrically conductive mirror plate layer that is electrically connected to the electrically conductive hinge layer; and wherein the electrically insulating layer is positioned between the electrically conductive layer and the mirror plate and patterned so as to allow electrical connection between the mirror plate and electrically conductive layer of the hinge.

The objects and advantages of the present invention will be obvious, and in part appear hereafter and are accomplished by the present invention. Such objects of the invention are achieved in the features of the independent claims attached hereto. Preferred embodiments are characterized in the dependent claims.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

Figure 1:
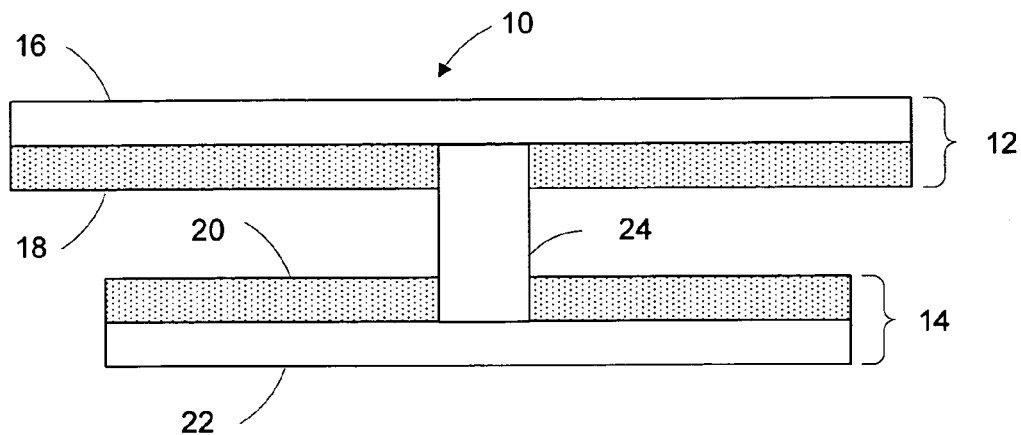
FIG. 1 is a cross-sectional view of two functional elements that are desired to be electrically connected in a MEMS device in which embodiments of the invention can be implemented.

Turning to the drawings, FIG. 1 illustrates a cross-sectional view of a portion of a MEMS device. MEMS device 10 comprises element 12 and 14 each or both can be the electrical or mechanical elements. Proper operations of the MEMS device require electrical connection between electrically conductive layers 16 in element 12 and 22 in element 14. However, the electrically conductive layers 16 and 22 are electrically isolated by an electrically insulating layer between layers 16 and 22, such as electrically insulating layer 18 in element 12 or layer 20 in element 14 or both. The electrically insulating layers are provided for many reasons, such as to improve the mechanical properties of elements 12 and/or 14, to prevent diffusion between sacrificial materials and layers 16 and/or 22 during fabrication, and to comply with other particular requirements. To enable the desired electrical connection between layers 16 and 22 while keeping the intervening insulating layer(s) therebetween, such as layers 18 and 20, the intervening electrically insulating layer(s) (e.g. layers 18 and 22) is patterned such that a portion of the intervening electrically insulating layer(s) is removed through which the electrically conductive layers are electrically connected. In the example shown in FIG. 1, electrically conductive layers 16 and 22 are electrically connected through connector 24 and the removed portion(s) in layer(s) 18 or (and) 20. In generally, any number of electrically insulating layers can be fabricated between electrically conductive layers 16 and 22 in the MEMS device. To enable the electrical connection between the two electrically conductive layers that are desired to be electrically connected, all intervening electrically insulating layer therebetween are patterned accordingly in a way as discussed above.

Figure 2:
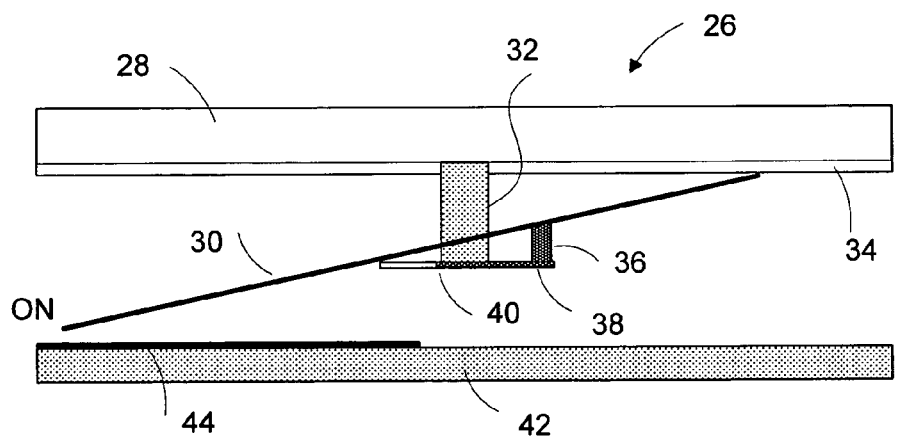
FIG. 2 illustrates a cross-sectional view of an exemplary micromirror device in which embodiments of the invention can be implemented.

As a way of example wherein the MEMS device is a reflective deflectable micromirror device as that shown in FIG. 2, elements 12 and 14 can be the mirror plate, hinge, hinge support, and post that are desired to be electrically connected. Referring to FIG. 2 where an exemplary micromirror device in which embodiments of the invention can be implemented, micromirror 26 comprises light transmissive substrate 28 on which post 32 is formed. Hinge support 40 is affixed to and thus held by the post on the light transmissive substrate. Deformable hinge 38 (with the length along a direction pointing out from the paper) is connected to the hinge support and held thereby. Mirror plate 30 having a surface reflective to visible light is attached to the deformable hinge via hinge contact 36 such that the mirror plate is capable of being deflected relative to substrate 28. The deflection is achieved through addressing electrode 44 that is fabricated on semiconductor substrate 42 and disposed proximate to mirror plate 30 at a vertical distance such that an electrical field established from the designed electrical voltage differences between the mirror plate and addressing electrode can derive an electrostatic force with sufficient strength to deflect the mirror plate. Other alternative features, such as light transmissive insulating layer 34 can be provided on the lower surface of substrate 28 and between the mirror plate and an electrode (not shown in the figure) disposed on the lower surface of substrate 28 to prevent potential electrical short.

The mirror plate, deformable hinge, hinge support, and post each comprise an electrically conductive layer that are desired to be electrically connected such that electrical signals (voltages) can be delivered to the mirror plate. For example, the mirror plate may comprise a light reflecting layer for reflecting the incident light and a mechanical enhancing layer for improving the mechanical properties of the mirror plate. The light reflective layer may comprise a metallic material, such as aluminum, gold, silver, and other suitable metallic materials; and is an electrically conducting layer. The electrically conductive layer, however, is often mechanically inferior, which dos not satisfy the mechanical requirement on the deflectable mirror plate. For this and other purposes, the mirror plate may comprise a mechanical enhancing layer, such as a ceramic layer to improve the mechanical properties. Most of the ceramic materials suitable for MEMS devices, however, are electrically insulating. When fabricated on the mirror plate and between the mirror plate and deformable hinge, the electrically insulating layer interdicts the desired electrical connection between the electrically conducting layers in the mirror plate and deformable hinge.

Alternative to the electrically insulating layer in the mirror plate, the deformable hinge may comprise an electrically insulating layer, such as a ceramic layer for improving the mechanical properties of the deformable hinge, which interdicts the desired electrical connection. The hinge support and post each may comprise a mechanical enhancing layer for improving the mechanical properties thereof. The mechanical enhancing layer(s), such as ceramic material, are often times electrically insulating.

To get through the desired electrical connection, the electrical insulating layers that interdict the desired electrical connection are patterned accordingly. An example of such patterning will be detailed afterwards with reference to FIG. 7 to FIG. 9.

The micromirror shown in FIG. 2 is one of many possible exemplary MEMS devices in which embodiments of the invention are applicable. In terms of micromirrors, there are many variations. For example, instead of on separate substrates, the mirror plate and addressing electrode can be formed on the same substrate, such as semiconductor substrate 42 in FIG. 2. The mirror plate and deformable hinge in FIG. 2 are spaced apart in a direction perpendicular to substrate 28, and are located in separate planes parallel to substrate 28 when the mirror plate is not deflected. In an alternative embodiment, the mirror plate can be in the same plane of the deformable hinge when the mirror plate is not deflected. In particular, the mirror plate or the hinge or both can be derived from a single crystal, such as single crystal silicon with suitable coatings thereon, as set forth in U.S. patent application Ser. No. 11/056,732, Ser. No. 11/056,727; and Ser. No. 11/056,752, all filed Feb. 11, 2005, the subject matter of each being incorporated herein by reference.

Figure 3:
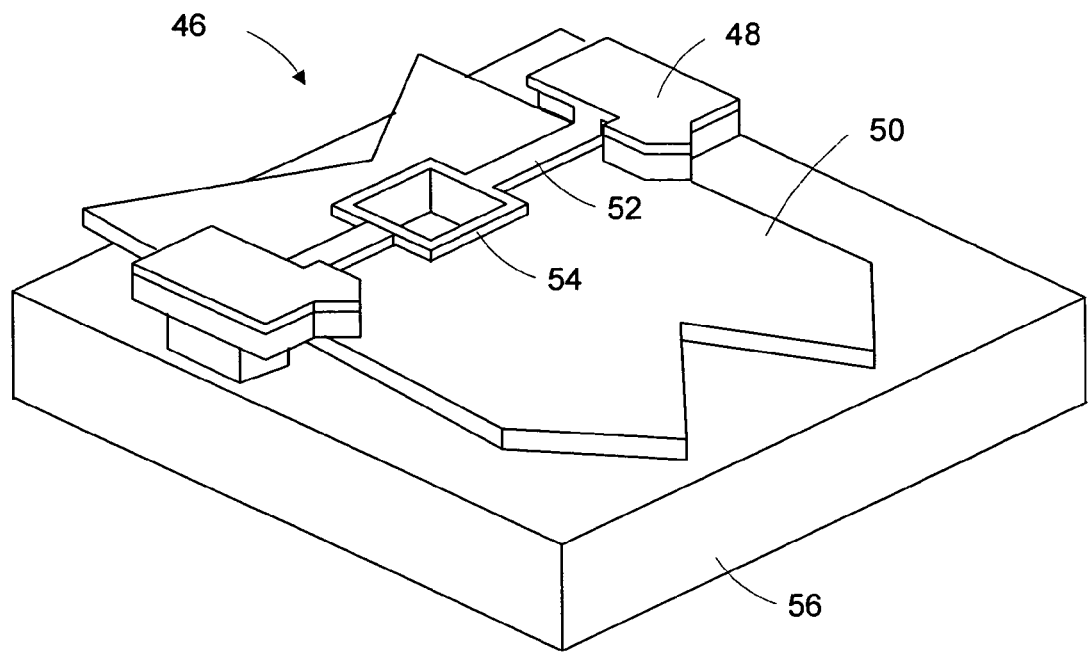
FIG. 3 is a perspective view of an exemplary micromirror having a cross-sectional view of FIG. 2.

As a way of exemplary implementation, a micromirror is demonstrated in FIG. 3. Referring to FIG. 3, micromirror 46 comprises a mirror plate 50 attached to deformable hinge 52 via hinge contact 54. The deformable hinge is affixed to post 48 that are formed on light transmissive substrate 56. The posts, deformable hinge, hinge contact, and mirror plate each comprises an electrically conductive layer that are connected together—allowing for delivery of electrical signals to the mirror plate.

The mirror plate, hinge, and posts each are multi-layered structures. For example, the mirror plate may comprise a $SiO_x$ insulating layer, an aluminum layer for reflecting incident light preferably having a wavelength in the range of visible light, a Ti layer to avoid generation of uneven structures in the mirror plate, and a $TiN_x$ barrier layer for preventing possible diffusion between the aluminum layer and sacrificial layers during fabrication. The deformable hinge may comprise an electrically conductive $TiN_x$ layer that is sandwiched between electrically insulating $SiN_x$ layers. To enable the electrical connection between the deformable hinge and mirror plate, the electrically insulating layers, $SiO_x$ layer in the mirror plate and $SiN_x$ layer in the deformable hinge are patterned such that the electrically conductive layers of aluminum (or Ti) in the mirror plate and $TiN_x$ layer in the deformable hinge are electrically connected.

The post may comprise a $TiN_x$ and $SiN_x$ layers. The electrically insulating layers of $SiN_x$ in the deformable hinge and post are patterned to allow the electrical connection between the $TiN_x$ layers in the post and deformable hinge.

Figure 4:
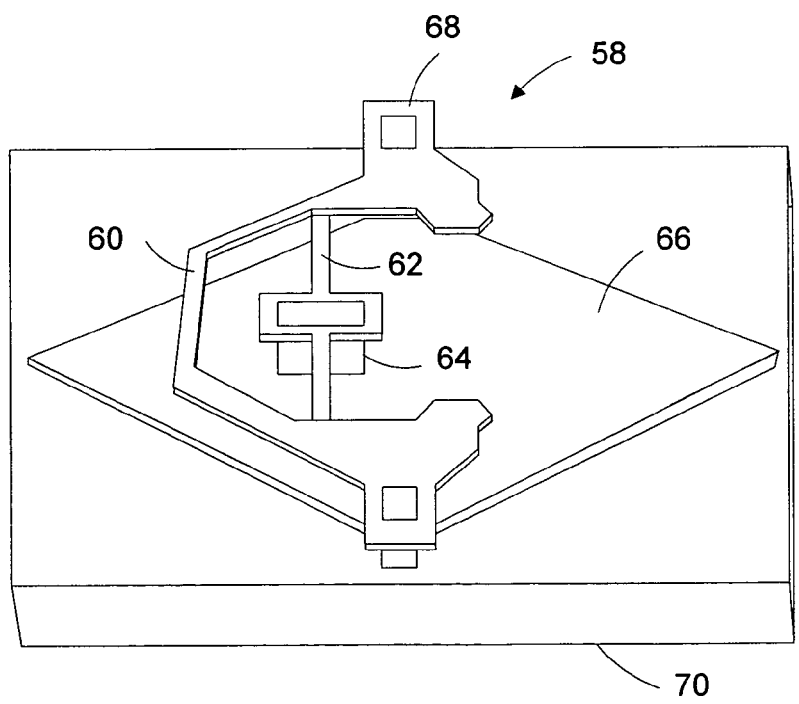
FIG. 4 is a perspective view of another exemplary micromirror having a cross-sectional view of FIG. 2.

Another exemplary micromirror in which embodiments of the invention can be implemented is demonstrated in FIG. 4. Referring to FIG. 4, micromirror 58 comprises mirror plate 66 attached to deformable hinge 62 through hinge contact 64. The deformable hinge is connected to and held by hinge support 60. The hinge support is connected to posts 68 on light transmissive substrate 70. With the above configuration, the mirror plate is capable of being deflected relative to substrate 70, such as by an electrostatic force.

The mirror plate, deformable hinge, and posts may or may not have the same multi-layers as those counterparts in micromirror 46 shown in FIG. 3 as discussed above. Similarly, the electrical insulating layers between the electrically insulating layers in mirror plate, hinge, hinge support, and posts, which otherwise may interdict the desired electrical connection of the mirror plate, hinge, hinge support, and posts, are patterned accordingly.

Patterning of the electrically insulating layers to allow for desired electrical connection can be carried out in many ways, one of which will be discussed in detail with reference to an exemplary fabrication of micromirror in FIG. 2 in the following with reference to FIG. 5A to FIG. 9. It will be appreciated by those ordinary skills in the art that the following discussion is for demonstration only and should not be interpreted as a limitation.

Figure 5A:
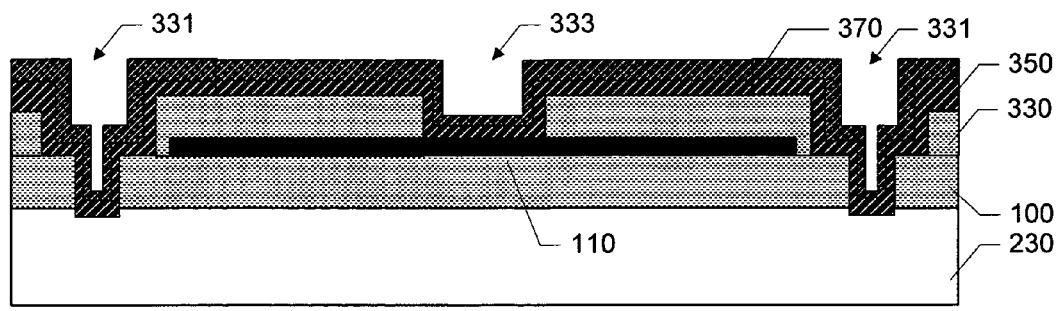
FIG. 5A is a cross-sectional view of the micromirror device of FIG. 4 before patterning the hinge structure layers during an exemplary fabrication process.

Referring FIG. 5A, substrate 230 is provided. First sacrificial layer 100 is deposited on the substrate followed by a deposition of mirror plate layer 110. The substrate is preferably a light transmissive substrate, such as glass (e.g. 1737F, Eagle 2000), quartz, Pyrex™, and sapphire. The substrate may also be a semiconductor substrate (e.g. silicon substrate) with one or more actuation electrodes and/or control circuitry (e.g. CMOS type DRAM) formed thereon.

First sacrificial layer 100 may be any suitable materials, such as amorphous silicon, polymer, and polyimide, and polysilicon, silicon nitride, silicon dioxide depending upon the structural materials of the micromirror selected to be resistant to the etchant, and the etchant selected. If the first sacrificial layer is amorphous silicon, it can be deposited at 300-350° C. The thickness of the first sacrificial layer can be wide ranging depending upon the micromirror size and desired titled angle of the micromirror, though a thickness of from 500 Å to 50,000 Å, preferably around 10,000 Å, is preferred. The first sacrificial layer may be deposited on the substrate using any suitable method, such as LPCVD or PECVD.

After depositing the first sacrificial layer, a plurality of structure layers will be deposited and patterned as appropriated. According to the invention, a structural layer is a layer that will not be removed after the removal of the sacrificial layers. The first structural layer deposited on the first sacrificial layer is mirror plate layer 110 for forming a reflective mirror plate. Because the mirror plate is designated for reflecting incident light in the spectrum of interest (e.g. visible light spectrum), it is preferred that the mirror plate layer comprises of one or more materials that exhibit high reflectivity (preferably 90% or higher, such as 99% or higher) to the incident light. Examples of such materials are Al, Au, Ag, $AlSi_xCu_y$, $AlTi_x$, or $AlSi_x$. Of course, other suitable materials having high reflectivity to the incident light of interest may also be adopted for the mirror plate. In depositing the mirror plate layer, PVD is preferably used. The thickness of the mirror plate layer can be wide ranging depending upon many factors, such as desired mechanical (e.g. stiffness and strength) and electronic (e.g. conductivity) properties, the size, desired rotation angle of the mirror plate and the properties of the materials selected for the mirror plate. According to the invention, a thickness of from 500 Å to 50,000 Å, preferably around 2500 Å, is preferred. If the mirror plate layer comprises aluminum, it is preferred to be deposited at 150° C. to 300° C. or other temperatures preferably less than 400° C.

In addition to the reflective layer, the mirror plate may also comprise a mechanical enhancing layer, such as a $TiN_x$ layer, for improving the mechanical properties of the mirror plate. The mirror plate may comprise other suitable functional layers. For example, a barrier layer can be provided for the mirror plate to prevent potential diffusion between the mirror plate layer(s) and the sacrificial material, especially when the mirror plate comprises an aluminum layer and amorphous silicon is used as the sacrificial material. Such barrier layer can be $SiO_x$ or other suitable materials.

When the metallic reflective layer of the mirror plate is deposited, the metallic reflective layer may form helixes. This problem can be solved by depositing another protective layer, such as a Ti layer on the metallic reflective layer.

When the mirror plate comprises multiple layers of different mechanical and thermal properties, such as different coefficients of thermal-expansion (CTE), the mirror plate may be curved after removal of the sacrificial materials. Such curvature may or may not be desired. When such curvature is not desired, one or more balance layers can be provided, such as formed on the opposite surfaces of the mirror plate.

In accordance with an embodiment of the invention, the mirror plate comprises an electrically conductive layer on which electrical voltages can be applied, and an electrically insulating layer for enhancing a property (e.g. the mechanical property) of the mirror plate.

Mirror plate layer 110 is then patterned into a desired shape, such as the shapes illustrated in FIG. 3 and FIG. 4. Though preferred, it would be appreciated by those ordinary skilled in the arts that this particular example of micromirror shape is a selection from a variety of optional choices of mirror shapes and is for demonstration purpose only. It should not be interpreted as a limitation. Instead, the mirror plate can be of any desired shape. The patterning of the mirror plate can be achieved using the standard photoresist patterning followed by etching using, for example $CF_4$, $Cl_2$, or other suitable etchant depending upon the specific material of the mirror plate.

When the mirror plate is a multilayered structure and comprises an electrically insulating and electrically conductive layer, the two layers may be patterned differently so as to provide electrical contact to the deformable hinge, which will be discussed in detail afterwards with reference to FIG. 8.

After forming the mirror plate, second sacrificial layer 330 is deposited and patterned according to the desired configuration of the hinge structure. Second sacrificial layer 330 may comprise amorphous silicon, or could alternatively comprise one or more of the various materials mentioned above in reference to first sacrificial layer 100. First and second sacrificial layers need not be the same, though are the same in the preferred embodiment such that the etching process for removing these sacrificial layers can be greatly simplified. Similar to the first sacrificial layer, second sacrificial layer 330 may be deposited using any suitable method, such as LPCVD or PECVD. If the second sacrificial layer comprises amorphous silicon, the layer can be deposited around 350° C. The thickness of the second sacrificial layer can be on the order of 9000 Å, but may be adjusted to any reasonable thickness, such as between 2000 Å and 20,000 Å depending upon the desired distance (in the direction perpendicular to the mirror plate and the substrate) between the mirror plate and the hinge. Second sacrificial layer 330 may also fill in the trenches left from the patterning of the mirror plate.

The deposited second sacrificial layer is patterned afterwards for forming two deep-via areas 331 and shallow via area 333 using standard lithography technique followed by etching. The etching step may be performed using $Cl_2$, $BCl_3$, or other suitable etchant depending upon the specific material(s) of the second sacrificial layer. The distance across the two deep-via areas 331 depends upon the side-to-side distance of the mirror plate. In an embodiment of the invention, the distance across the two deep-via areas after the patterning is preferably around 10 μm, but can be any suitable distance as desired. In order to form shallow-via area 333, an etching step using $CF_4$ or other suitable etchant may be executed. The shallow-via area, which can be of any suitable size, is preferably on the order of 2.2 μm.

In order to form the desired deep-via area 331 profiles as shown, a via-mask and partial sacrificial layer etching are applied. According to an embodiment of the invention, the wider region of each deep-via area 331 is on the order of 1.0 to 2.0 um, preferably 1.4 um, and the smaller region is on the order of 0.5 to 1.5 um, preferably 1.0 um. Of course, other dimensions are possible depending upon the final size and shape of the mirror plate. As an optional feature, the deep-via areas may reach through first sacrificial layer 100 and may reach from 500 Å to 2000 Å into substrate 230. As discussed above, the deep-via areas are formed in two etching steps. By doing so, the effect of resist erosion may be reduced, and step coverage of $SiN_x$ in the subsequent deep-via fill deposition may be improved. However, a single etching step can also be used.

After patterning the second sacrificial layer, hinge structure layers 350 and 370 are deposited on the patterned second sacrificial layer 330. During the deposition, layers 350 and 370 fill the formed deep-via areas 331 and shallow-via area 333. Because the hinge structure layers also form the posts (e.g. 68 in FIG. 4) for holding the hinge (e.g. 62 in FIG. 4) and the mirror plate (e.g. 66 in FIG. 4) attached thereto such that the mirror plate can rotate relative to the substrate by the hinge, it is desired that the hinge structure layers (e.g. 350 and 370) comprise materials having a sufficiently large elastic modulus.

According to the invention, the hinge structures layers, thus the posts, comprise an electrically conductive material and electrically insulating material. The electrically conductive material transmits electrical signals, such as electrical voltages from external source to the mirror plate. The electrically insulating material improves a property, such as the mechanical property of the post and the hinge structure.

According to an embodiment of the invention, layer 350 comprises a 300 Å thickness of $TiN_x$ layer deposited by PVD, and layer 370 comprises a 3500 Å thickness of $SiN_x$ layer deposited by PECVD. Of course, other suitable methods of deposition may be used, such as LPCVD or sputtering. Alternatively, layer 350 can be a Ti layer with a preferred thickness of 200 Å. Layer 350 is not necessary for the invention, but provides a conductive contact surface between the micromirror and the hinge structure in order to, at least, reduce charge-induced stiction. It is preferable to deposit the $TiN_x$ and SiNx layers such that the intrinsic stress is as low as possible, preferably lower than 250 MPa. The $SiN_x$ layer can be deposited at 400° C. Of course, other suitable materials, such as $CoSiN_x$, $TiSiN_x$ and/or $TiO_x$ may also be used for the hinge structure. As an optional feature of the invention, layer 350 is not deposited and only layer 370 is deposited for the hinge structure. In this case, layer 370 is $SiN_x$ with a thickness of 1000 Å to 10,000 Å, preferably 4000 Å.

Figure 5B:
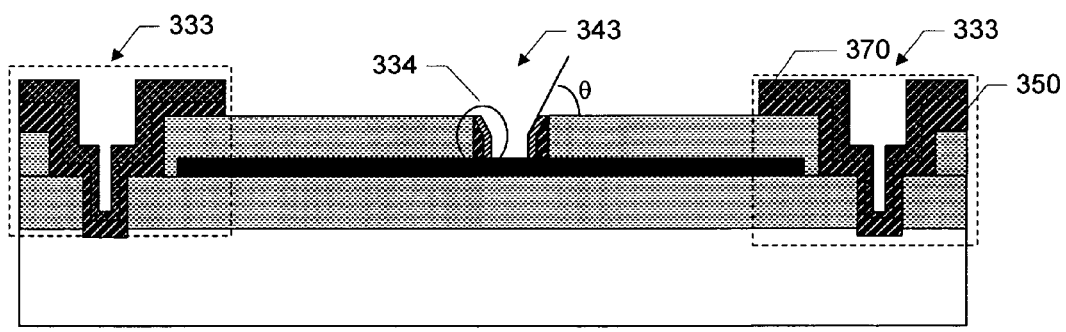
FIG. 5B is a cross-sectional view of FIG. 5A after patterning the hinge structure layers.

After the deposition, layers 350 and 370 are then patterned for forming the two posts 333 and contact 343 by etching using one or more proper etchants, as shown in FIG. 5B. In particular, the layers can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

Alternatively, the etching step can be performed after deposition of each hinge layer. For example, layer 350 can be etched and patterned after the deposition of layer 350 and before the deposition of layer 370. This may be important when the post layers (hinge structure layers) comprise an electrically insulating layer and an electrically conductive layer; and an electrical contact between the post and deformable hinge is to be formed. In this instance, the insulating layer and conductive layer may be patterned into different shapes. Specifically, the insulating layer may be pattered to have a contact area through which the electrically conductive layer of the post is electrically connected to the deformable hinge that is to be formed in the following. Pattering differently of the insulating and conductive layers of the post will be discussed in detailed afterwards with reference to FIG. 9.

After etching, two posts 333 and contact 343 are formed. According to the embodiment of the invention, each of the two posts 333 is formed with a tip 342 (as shown in FIG. 4) for limiting the rotation of the mirror plate in operation. The physical configuration (e.g. position and length) of the tip, along with the distance between the mirror plate and the substrate, determines the maximum rotation angle of the mirror plate, wherein the maximum rotation angle can be used to define the "ON" state of the micromirror device. In this situation, a uniform configuration of the tips of all individual micromirror devices ensures a uniform "ON" state for all micromirror devices. This certainly improves the performance of the micromirror devices, thus improves the quality of displayed images.

The bottom segment of contact 343 is removed by etching and a part of the mirror plate is thus exposed. The exposed part of the mirror plate will be used to form an electrical contact with the hinge. The sidewalls of contact 343 are left with residues of layers 350 and 370 after etching. The residue 334 has a slope measured by angle θ approximately 75 degrees, but may vary between 0 and 89 degrees.

Figure 5C:
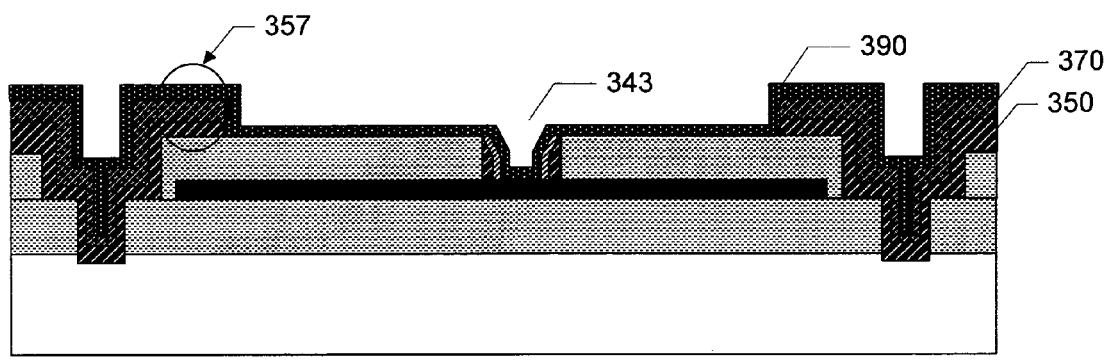
FIG. 5C is a cross-sectional view of FIG. 5B after depositing a and patterning hinge layers.

After patterning layers 350 and 370, hinge layer 390 is deposited and then patterned as shown in FIG. 5C. Because the hinge deforms with the mirror plate rotating, it is expected that the hinge is more susceptible to plastic deformation (e.g. fatigue, creep, or dislocation motion). Furthermore, when the hinge is also used as electric conducting media for the mirror plate, it is further expected that the hinge is electrically conductive.

Figure 5D:
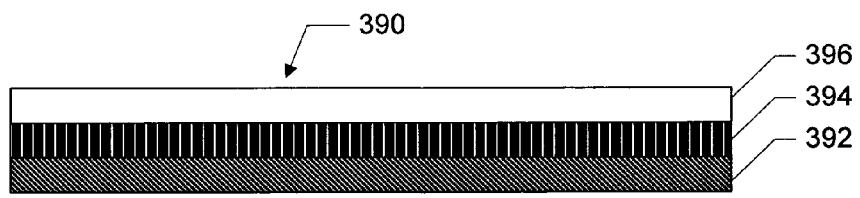
FIG. 5D is a cross-sectional view of a multiplayer hinge structure according to an embodiment of the invention.

According to an embodiment of the invention, hinge 390 is a multilayered structure, as shown in FIG. 5D. Referring to FIG. 5D, hinge 390 further comprises layers 392, 394 and 396. The outside layers 392 and 396 are electric conductors, such as an elemental metal substance, metalloid, inter-metallic compounds, conductive ceramics and metal alloys. And the intermediate layer is electric insulator, such as a ceramic. For example, the outside layers 392 and 396 comprise $TiN_x$, aluminum, titanium, Ir, titanium oxide(s), titanium carbide, $CoSi_xN_y$, $TiSi_xN_y$, $TaSi_xN_y$, $CoSi_xO_y$, or other ternary compositions such as set forth in U.S. patent application Ser. No. 09/910,537 to Reid filed Jul. 20, 2001 and Ser. No. 10/198,389 to Reid, filed Jul. 16, 2002, each incorporated herein by reference. In the preferred embodiment of the invention, the outside layers are $TiN_x$. The intermediate layer 394 can be any suitable ceramic, such as $SiN_x$, $SiO_x$, silicon carbide, or polysilicon. Therefore, a $TiN_x$—$SiN_x$—$TiN_x$ triple layer structure is preferably formed for the hinge. Alternatively W—$SiN_x$($SiO_y$)—W, Al—$SiN_x$($SiO_y$)—Al, Ti—$SiN_x$($SiO_y$)—Ti or Ti(Al)—$SiN_x$($SiO_y$)—Al(Ti) triple layer structure can also be formed for the hinge structure.

The thicknesses of the hinge layers can be adjusted depending on the materials selected and the desired mechanical and electric properties of the hinge, the stiffness of the movable element, the desired flexibility of the hinge, or other relevant factors. For example, for a Ti—$SiN_x$—Ti hinge stack, layer thicknesses on the order of 100-600-100 Å. For another example, for an Al—$SiO_x$—Ti triple structure, layer 392 is aluminum with a preferred thickness of 2500 Å for providing an efficient electric contact with the mirror plate, and with layer 396 being titanium with a preferred thickness of 80 Å. The intermediate layer 394 is a ceramic insulating layer, such as $SiO_2$ with a thickness of 400 Å, for properly insulting layers 392 from 396. Furthermore, the ceramic insulting layer 394 may also enhance mechanical properties, such as creep resistance and/or resistance to plastic deformation, of the hinge. Of course, these layer thicknesses can vary widely depending on any of the above factors. The layer thicknesses can also be adjusted to affect the overall intrinsic stress of the hinge. For example, if each of the outside layers 392 and 396 exhibits an intrinsic stress of −100 MPa (compressive) and intermediate layer 394 exhibits an intrinsic stress of +150 MPa (tensile), the thickness of the intermediate layer can be increased to ensure that the average intrinsic stress is tensile. If the intermediate layer thickness is increased to three times that of the outside layers, the average intrinsic stress is given by $[(-100)*2*(150)*3]/(2+3)$, or +50 MPa (tensile).

According to another embodiment of the invention, layer 392 is an electrically conducting layer that comprises a material having a resistivity less than 100,000 μΩ·cm. The intermediate layer 394 is an insulator with a resistivity greater than $10^{12}$ μΩ·cm. And layer 396 is an electrically conducting layer with a resistivity also less than 100,000 μΩ·cm.

According to yet another embodiment of the invention, layer 396 has a resistance to a gas-phase etchant higher than that of the intermediate layer 394. And layer 392 has a higher resistance than the intermediate layer 394 to the gas-phase etchant.

According to another embodiment of the invention, layers 396 and 392 are ceramic layers for enhancing the mechanical properties of the hinge. Exemplary materials for the outside layers 396 and 392 are silicon nitride(s), silicon oxide(s), silicon carbide(s), or polysilicon. And the intermediate layer 394 comprises electric conductors, such as single metal substance, metalloid, inter-metallic compounds, conductive ceramics and metal alloys. Exemplary materials for the intermediate layer 394 are $TiN_x$, aluminum, titanium, Ir, titanium oxide(s), titanium carbide, $CoSi_xN_y$, $TiSi_xN_y$, $TaSi_xN_y$, $CoSi_xO_y$ or other ternary compositions such as set forth in U.S. patent application Ser. No. 09/910,537 to Reid filed Jul. 20, 2001 and Ser. No. 10/198,389 to Reid, filed Jul. 16, 2002.

For example, a $SiN_x(SiO_y)$—$TiN_x(Ti, Al, W, CoSi_xO_y$ or $CoSi_xN_y$)—$SiN_x(SiO_y)$ triple layer structure can be formed for the hinge. In this configuration, layer 392 comprises a ceramic material. Layer 396 is a ceramic layer, which can be the same as layer 392. And the intermediate layer 394 is an electric-conducting layer functioning as an electric conducting media such that an electric field can be set up between the mirror plate and one or more electrodes. In this case, the intermediate layer 394 functions as an electric conducting media. In order to contact layer 394 with the mirror plate at contact area 343, the first deposited ceramic layer 392 will be patterned and etched before depositing the electric conducting layer 394 such that the segment of the ceramic layer 392 at the contact area 343 will be removed. Therefore, the conducting layer 394 can make an electric contact with the mirror plate at contact area 343 after being deposited.

In yet another embodiment of the invention, the intermediate layer 394 provides an electric contact with the mirror plate. Ideal materials for this layer are expected to be "good" conductors (e.g. with high electric conductivity). In addition, it is expected that the materials of this layer exhibits proper mechanical properties, such as high strength and large elastic modulus. A typical candidate material is titanium. Other suitable materials, such as Cu and silver can also be used for layer 394. However, these materials, especially titanium, exhibit low resistances to oxidization. When used alone for the hinge, titanium hinge is oxidized, and desired mechanical and electrical properties would not be guaranteed. In order to diminish the oxidization of layer 394, the bottom layer 392 and the top layer 396 are deposited for passivating the oxidization of the intermediate layer 394. Layers 392 and 396 may comprise materials with high resistances to oxidation. Exemplary materials for these two layers are aluminum, $SiN_x$, $SiO_x$, Cr, $TiN_x$ and Au. Alternatively, an additional layer (not shown) can be deposited on the intermediate layer 394 before depositing the top layer 396. The additional layer can be deposited for enhancing the mechanical property of the hinge. Specifically, the additional layer can be $SiN_x$. In this regards, a tetra-layered structured, such as $TiN_x$—Ti—$SiN_x$—$TiN_x$ is formed for the hinge.

The multilayered structure as shown in FIG. 5D comprises three layers. It will be appreciated by those of ordinary skill in the art that the number of layers of the multilayered structure in FIG. 5D should not be interpreted as a limitation. Instead, any number of layers can be employed without depart from the spirit of the present invention.

In the embodiments described above, the hinge is a multilayered structure. However, the hinge can be a single electric conducting layer, such as single metals, metal compounds or metal alloys. Examples of suitable materials for the hinge layer are silicon nitride, silicon carbide, polysilicon, Al, Ir, titanium, titanium nitride, titanium oxide(s), titanium carbide, $CoSi_xN_y$, $TiSi_xN_y$, $TaSi_xN_y$, or other ternary and higher compounds. When titanium is selected for the hinge layer, it can be deposited at 100° C. to 400° C.

After deposition, the hinge layers are then patterned and etched. Similar to the hinge structure layers (layers 350 and 390), the hinge layers can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g.

chlorine chemistry for a metal layer, hydrocarbon or fluorocarbon (or $SF_6$) plasma for silicon or silicon compound layers, etc.). Alternatively, the hinge layers 392, 394 and 396 can be patterned and etched consecutively after depositions.

Figure 6:
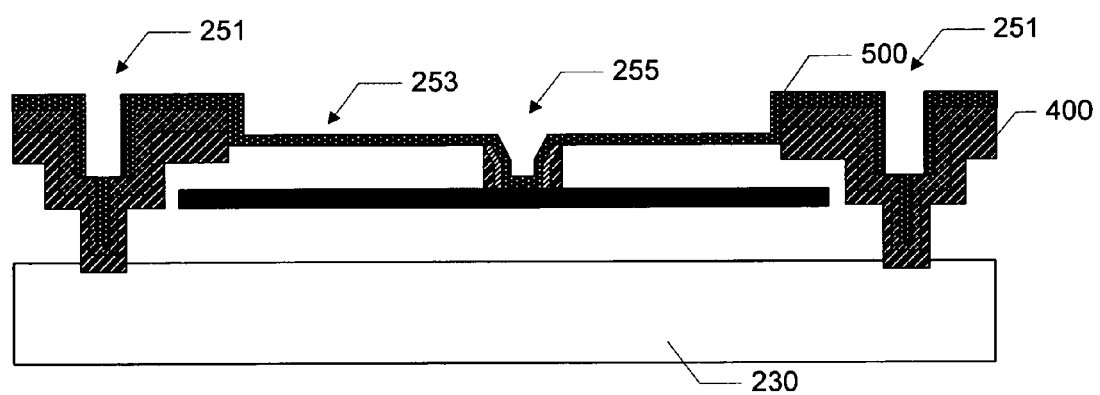
FIG. 6 is the cross-sectional view of FIG. 5D after removing the first and second sacrificial layers.

Finally, the first and second sacrificial layers 100 and 330 are removed using etching so as to release mirror plate 110. FIG. 6 shows a cross-sectional view of the micromirror device after releasing. As can be seen in the figure, posts 251 is formed on substrate 230 and hold hinge 253, to which mirror plate 110 is attached. The mirror plate is capable of rotating relative to the substrate by the hinge.

The release etch utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are spontaneous chemical vapor phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise additional gas components such as $N_2$ or an inert gas (Ar, Xe, He, etc.). In this way, the remaining sacrificial material is removed and the micromechanical structure is released. In one aspect of such an embodiment, $XeF_2$ is provided in an etching chamber with diluent (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $ScCO_2$, or supercritical $CO_2$ (the use of supercritical $CO_2$ as an etchant is described in U.S. patent application Ser. No. 10/167,272). Of course, the use of any of these etchants/methods requires that the material(s) to be etched are not resistant to the particular etchant used.

As discussed above, the mirror plate, deformable hinge, and posts each may comprise multiple layers; and one or more of the multiple layers are electrically insulating. On the other hand, the mirror plate is required to be electrically connected to the external electrical sources. An approach is to electrically connect the mirror plate to the post via the conductive material of the deformable hinge, and electrically connect the post to the external electrical signals. For this reason, the electrical insulating layer between the electrical conductive layers in the mirror plate, the deformable hinge, and the post may be patterned.

Figure 7:
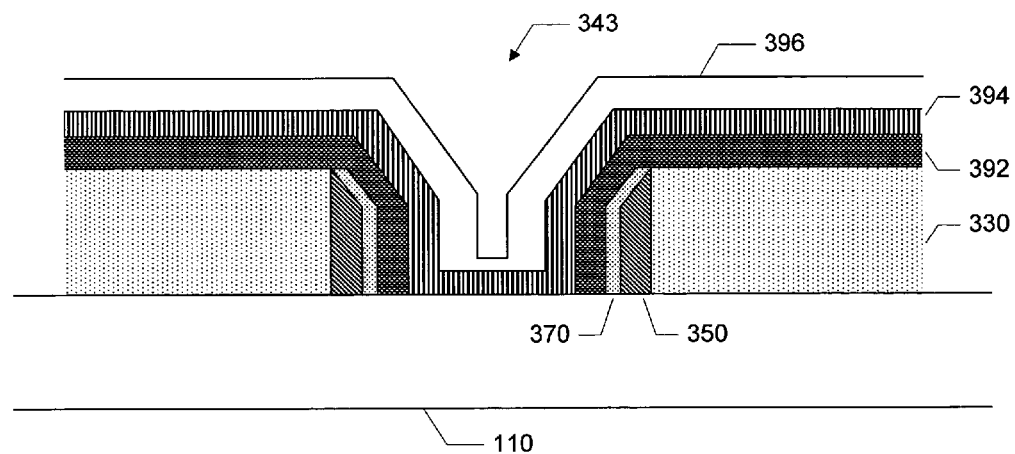
FIG. 7 is an exploded cross-sectional view of the hinge contact area in FIG. 5C illustrating the electrical connection between the hinge and mirror plate according to an embodiment of the invention.

As a way of example, when hinge layer 390 in FIG. 5C and FIG. 5D comprises hinge layer 392 that is electrically insulating, hinge layer 392 is then patterned so as to enable electrical contact between electrical conductive layer 394 of the hinge and mirror plate 230, as shown in FIG. 7.

FIG. 7 is an exploded view showing the area in the vicinity of contact area 343 in FIG. 5C. Assuming the top layer of mirror plate 110 is electrically conductive, hinge layer 392 that is electrically insulating is then patterned such that the mirror plate at the bottom of contact area 343 is exposed. Hinge layer 392 that is electrically conductive then fills the exposed area of the mirror plate at the bottom of the contact area, and thus electrically being connected to the mirror plate. This can be accomplished by patterning the multiple hinge layers differently. For example, hinge layer 392 can be deposited and pattered prior to the deposition and patterning of hinge layer 394. Other hinge layers, if any such as hinge layer 396 can be deposited and patterned thereafter.

Figure 8:
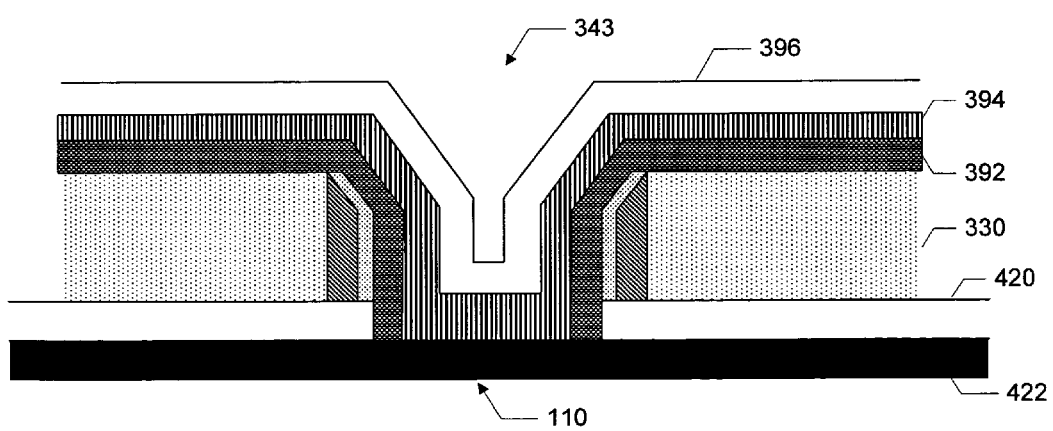
FIG. 8 is yet another exploded cross-sectional view of the hinge contact area in FIG. 5C illustrating the electrical connection between the hinge and mirror plate according to another embodiment of the invention.

The mirror plate may also comprise multiple mirror plate layers and an electrically insulating layer may be formed on the top of the mirror plate, as illustrated in FIG. 8. In this instance, the top insulating layer of the mirror plate needs to be patterned.

Referring to FIG. 8, mirror plate 110 comprises mirror plate layers 422 and 420. Layer 422 is electrically conductive, while layer 420 is electrically insulating. Electrical contact between the hinge and mirror plate is enabled by patterning insulating layer 420 such that ten portion of layer 422 at the bottom of contact 343 is exposed to the electrically conductive hinge layer (e.g. hinge layer 394).

In the example shown in FIG. 8, conductive mirror plate layer 422 and conductive layer 394 of the hinge are separated by insulating layer 392 of the hinge and insulating layer 420 of the mirror plate. This is only one of many possible examples. The conductive layers of the hinge and mirror plate may be separated by any number of insulating layers of the hinge and/or mirror plate depending upon the specific configurations of the mirror plate and hinge, which will not be discussed in detail herein.

In order to provide electrical connection of the hinge to the post, the post(s) may be patterned such that the electrically conductive layer of the hinge is electrically connected to the electrically conductive layer of the post. One example is schematically illustrated in FIG. 9.

Figure 9:
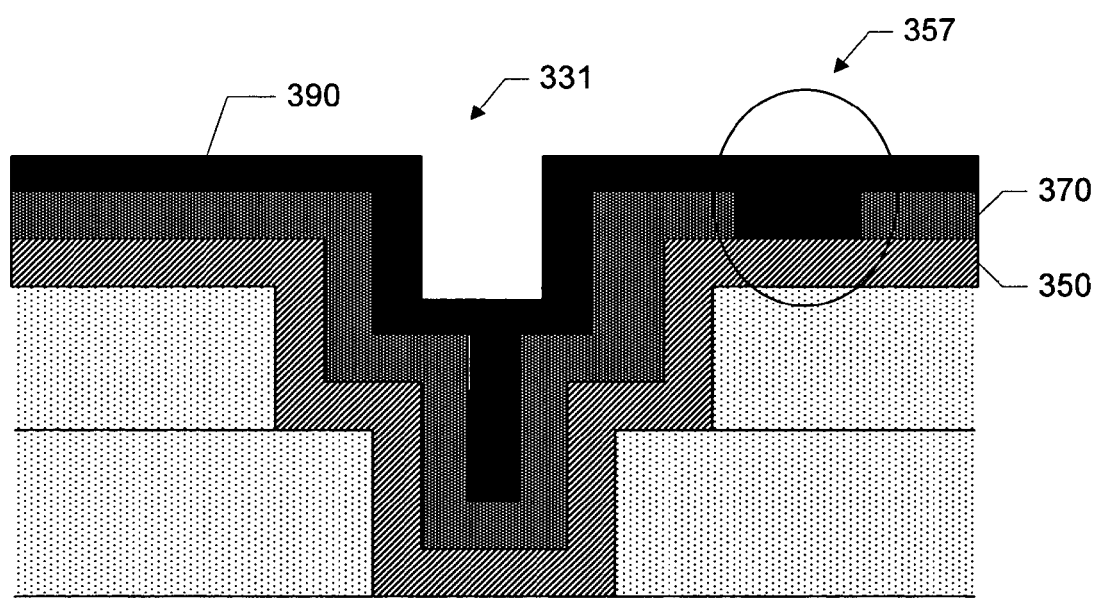
FIG. 9 is an exploded cross-sectional view of the hinge contact area in FIG. 5C illustrating the electrical connection between the post and hinge according to an embodiment of the invention.

FIG. 9 is an exploded view showing the area in the vicinity of post 331 in FIG. 7. Post layer 350 is electrically conductive; and post layer 370 is electrically insulating. Insulating post layer 370 is patterned at region 357 such that conductive hinge layer 390 is electrically connected to conductive post layer 350. When hinge layer 390 is a multilayered structure comprising an insulating layer between the conductive layer of the hinge and the post layers of 370 and 350, the insulating hinge layer is then patterned at area 357 to allow electrical connection between the conductive layers in the hinge and post.

The electrically conductive layer of the post(s) can be further electrically connected to an electrical contact pad disposed on the substrate, and the contact pad on the substrate can be wired to a contact pad on a package with an electrically conductive wire. Specifically, when the mirror plate is formed on a light transmissive substrate with a semiconductor substrate disposed approximate to, as shown in FIG. 2, electrical contact of the post can be extended to the semiconductor substrate via an electrically conductive structure disposed between the two substrates, such set forth in U.S. patent application Ser. No. 11/102,082 filed Apr. 8, 2005, the subject matter being incorporated herein by reference in its entirety.

The micromirror device as discussed above can be formed into a micromirror array and used in a spatial light modulator in a display system. In general, a spatial light modulator in a display system comprises an array of thousands or millions of micromirror devices, the total number of which determines the resolution of the displayed images. For example, the micromirror array of the spatial light modulator may have 1024×768, 1280×720, 1400×1050, 1600×1200, 1920×1080, or even larger number of micromirrors. In other applications, the micromirror array may have fewer number of micromirrors.

Figure 10:
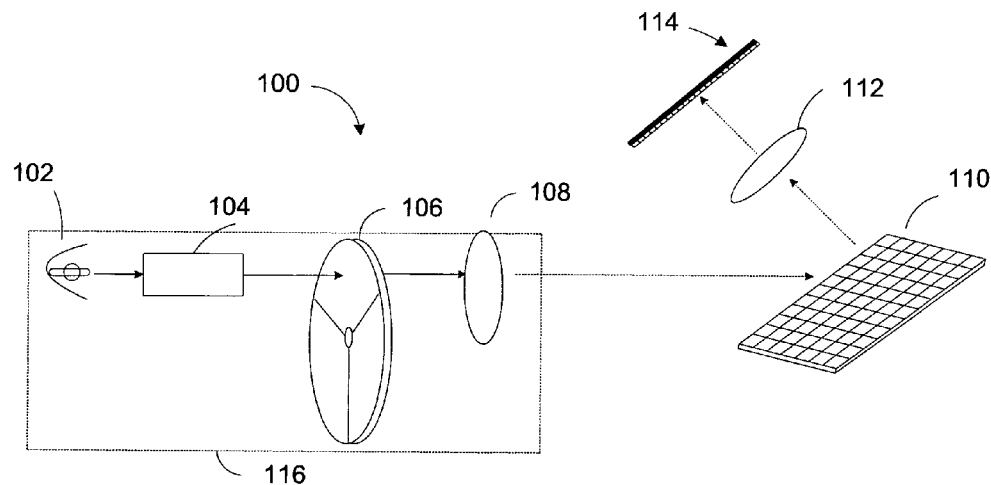
FIG. 10 is a diagram illustrating an exemplary display system employing a spatial light modulator.

FIG. 10 schematically illustrates an exemplary display system that employs a spatial light modulator in which embodiment of the invention can be implemented. In this particular example, display system 100 comprises light source illumination system 116, group lens 108, spatial light modulator 110, projection lens 112, and display target 114. The illumination system may further comprise light source 102, light pipe 104, and color filter 106 such as a color wheel. Alternative to the illumination system 116 as shown in the figure wherein the color wheel is positioned after the light pipe along the propagation path of the illumination light from the light source, the color wheel can also be positioned between the light source and light pipe at the propagation path of the illumination light. The illumination light can be polarized or non-polarized. When polarized illumination light is used, display target 114 may comprise a polarization filter associated with the polarized illumination light, as set forth in U.S. provisional patent application Ser. No. 60/577,422 filed Jun. 4, 2004, the subject matter being incorporated herein by reference.

The lightpipe (104) can be a standard lightpipe that are widely used in digital display systems for delivering homogenized light from the light source to spatial light modulators. Alternatively, the lightpipe can be the one with movable reflective surfaces, as set forth in U.S. patent provisional application Ser. No. 60/620,395 filed Oct. 19, 2004, the subject matter being incorporated herein by reference.

The color wheel (106) comprises a set of color and/or white segments, such as red, green, blue, or yellow, cyan, and magenta. The color wheel may further comprise a clear or non-clear segment, such as a high throughput segment for achieving particular purposes, as set forth in U.S. patent application Ser. No. 10/899,637, and Ser. No. 10/899,635 both filed Jul. 26, 2004, the subject matter of each being incorporated herein by reference, which will not be discussed in detail herein.

Figure 11:
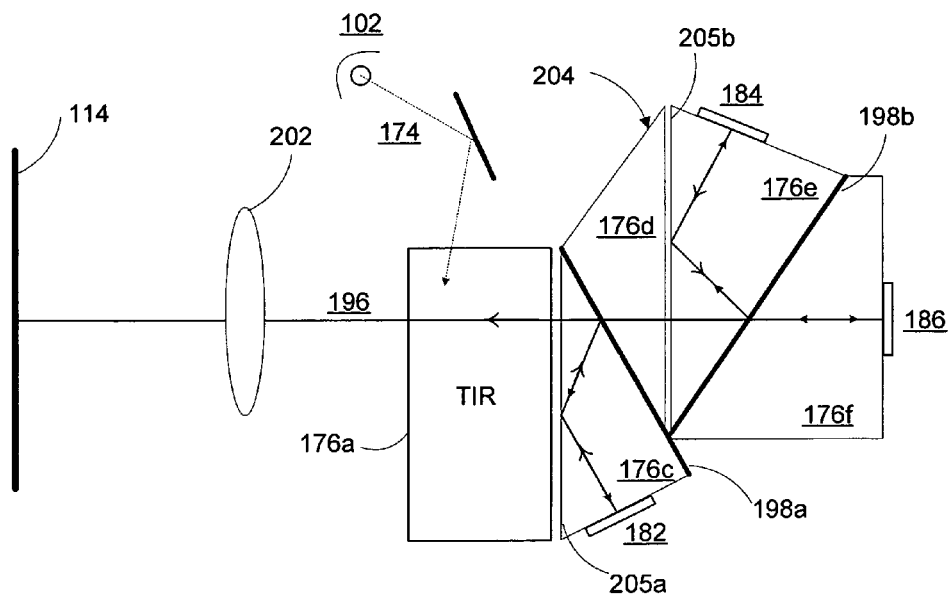
FIG. 11 is diagram illustrating another exemplary display system employing a spatial light modulator.

The display system in FIG. 10 employs one spatial light modulator. However, a display system may use multiple spatial light modulators for modulating the illumination light of different colors. One of such display systems is schematically illustrated in FIG. 11. Referring to FIG. 11, the display system uses a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a and 205b, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By coordinating operations of the three spatial light modulators, red, green, and blue lights can be properly modulated. The modulated red, green, and blue lights are recollected and delivered onto display target 114 through optic elements, such as projection lens 202, if necessary.

The light source, such as light source 102 in FIG. 10 and FIG. 11, of the display system can be any suitable light source, such as an arc lamp, preferably an arc lamp with a short arc for providing intensive illumination light. The light source can also be an arc lamp with a spiral or other reflector, such as set forth in U.S. patent application Ser. No. 11/055,654 filed Feb. 9, 2005, the subject matter being incorporated herein by reference.

Alternatively, the light source can be one or more light-emitting-diodes (LEDs), preferably LEDs of high intensities, due to their compact sizes, low costs, and capabilities of emitting different colors including white. The display system may employ one LED as the light source, in which instance, a LED emitting white color can be used. Alternatively, the display system may use different LEDs for generating red, green, and blue colors for illuminating the spatial light modulator. As an example, gallium nitride light emitting diodes could be used for the green and blue arrays and gallium arsenide (aluminum gallium arsenide) could be used for the red light emitting diode array. LEDs such as available or disclosed by Nichia™ or Lumileds™ could be used, or any other suitable light emitting diodes. When LEDs emitting different colors are used as the light source, the color wheel (e.g. color wheel 106 in FIG. 10) may be omitted.

In yet another example, an array of LEDs emitting the same (or similar) color can be used for generating a color light for illuminating the spatial light modulator. For example, an array of LEDs emitting white color can be used as the light source for providing intensive illumination light. In some instances, the LEDs can be used along with an arc lamp as the light source for the system. Also, separate groups of LEDs (e.g. red, green and blue) can be provided, or a mixed array of different color LEDs (e.g. red, green and blue) could also be used.

It will be appreciated by those of skill in the art that a new and useful spatial light modulator has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. In particular, the Sandia SUMMiT process (using polysilicon for structural layers) or the Cronos MUMPS process (also polysilicon for structural layers) could be used in the present invention. Also, a MOSIS process (AMI ABN—1.5 um CMOS process) could be adapted for the present invention, as could a MUSiC process (using polycrystalline SiC for the structural layers) as disclosed, for example, in Mehregany et al., Thin Solid Films, v. 355-356, pp. 518-524, 1999. Also, the sacrificial layer and etchant disclosed herein are exemplary only. For example, a silicon dioxide sacrificial layer could be used and removed with HF (or HF/HCl), or a silicon sacrificial could be removed with $ClF_3$ or $BrF_3$. Also a PSG sacrificial layer could be removed with buffered HF, or an organic sacrificial such as polyimide could be removed in a dry plasma oxygen release step. Of course the etchant and sacrificial material should be selected depending upon the structural material to be used. Also, though PVD and CVD are referred to above, other thin film deposition methods could be used for depositing the layers, including spin-on, sputtering, anodization, oxidation, electroplating and evaporation. Therefore, the invention as described herein contemplates all such embodiments as may come within the scope of the following claims and equivalents thereof.

We claim:

1. A micromirror array device, comprising:
   a substrate;
   a post on the substrate, the post comprising an electrically conductive post layer;
   a deformable hinge held by the post on the substrate, the hinge comprising an electrically conductive hinge layer, wherein the electrically conductive hinge layer is electrically connected to the electrically conductive post layer of the post; and
   a reflective and deflectable mirror plate attached to the deformable hinge such that the mirror plate is capable of rotating relative the substrate, said mirror plate comprising an electrically conductive mirror plate layer that is electrically connected to the electrically conductive hinge layer;
   wherein at least one of the post, hinge or mirror plate further comprises an electrically insulating layer that is patterned so as to allow electrical connection to the electrically conductive layer of the another one of the post, hinge or mirror plate.

2. The device of claim 1, wherein the deformable hinge comprises the insulating layer.

3. The device of claim 2, wherein the insulating layer of the hinge is patterned differently than the conductive layer of the hinge.

4. The device of claim 3, wherein the insulating layer of the hinge comprises a contact area through which the conductive layers of the mirror plate and hinge are electrically connected.

5. The device of claim 2, wherein the hinge comprises another insulating layer; and wherein the conductive layer of the hinge is laminated between the insulating layer and said another insulating layer of the hinge.

6. The device of claim 2, wherein the conductive layer of the hinge comprises $TiN_x$.

7. The device of claim 2, wherein the insulating layer of the hinge comprises $SiN_x$.

8. The device of claim 5, wherein said another insulating layer of the hinge comprises $SiN_xX$.

9. The device of claim 1, wherein the mirror plate comprises the insulating layer.

10. The device of claim 9, wherein the insulating layer of the mirror plate is patterned differently than the conductive layer of the mirror plate.

11. The device of claim 10, wherein the insulating layer of the hinge comprises a contact area through which the conductive layers of the mirror plate and hinge are electrically connected.

12. The device of claim 11, wherein the mirror plate comprises another insulating layer; and wherein the conductive layer of the mirror plate is laminated between the insulating layer and said another insulating layer of the mirror plate.

13. The device of claim 9, wherein the conductive layer of the mirror plate comprises aluminum.

14. The device of claim 9, wherein the conductive layer of the mirror plate comprises titanium.

15. The device of claim 9, wherein the insulating layer of the mirror plate comprises $SiO_x$.

16. The device of claim 12, wherein said another insulating layer of the hinge comprises $SiO_x$.

17. The device of claim 1, wherein the post comprises the insulating layer.

18. The device of claim 17, wherein the insulating layer of the post is patterned differently than the conductive layer of the post.

19. The device of claim 18, wherein the insulating layer of the post comprises a contact area through which the conductive layers of the post and hinge are electrically connected.

20. The device of claim 19, wherein the conductive layer of the post comprises $TiN_x$.

21. The device of claim 19, wherein the insulating layer of the post comprises $SiO_x$.

22. The device of claim 1, wherein the substrate is transmissive to visible light.

23. The device of claim 22, further comprising:
a semiconductor substrate on which an addressing electrode is formed, said semiconductor substrate being disposed proximate to the light transmissive substrate such that the mirror plate is capable of being deflected an electrostatic filed between the mirror plate and the addressing electrode.

24. The device of claim 23, wherein the semiconductor substrate is bonded to the light transmissive substrate.

25. The device of claim 24, further comprising:
a substrate post comprising an electrically conductive material that is electrically connected to the conducting layer of the post, said substrate post being disposed between the two substrates.

26. The device of claim 25, wherein the substrate post is electrically connected to a contact pad on the semiconductor substrate.

27. The device of claim 26, wherein the semiconductor substrate is disposed on a package substrate; and wherein the contact pad of the semiconductor substrate is wired to an electrical contact on the package substrate.

28. The device of claim 1, wherein the mirror plate is a member of an array of mirror plates.

29. The device of claim 28, wherein the conducting layers of the mirror plates are electrically connected.

30. A projection system, comprising:
an illumination system providing a light beam;
a spatial light modulator comprising an array of micromirrors of claim 1 for modulating the light beam from the illumination system; and
a projection lens for projecting the modulated light beam onto a display target.

31. The system of claim 30, wherein the illumination system comprises:
a light source producing light;
a lightpipe delivering the light onto the spatial light modulator; and
a color wheel disposed at a propagation path of the light, the color wheel comprising a set of color segments.

32. The system of claim 31, wherein the light source is an arc lamp.

33. The system of claim 31, wherein the light source is a LED.

34. The system of claim 32, wherein the illumination system comprises a LED.

35. The system of claim 34, wherein the LED produces a light that is red, green, or blue.

36. The system of claim 31, wherein the color wheel is disposed between the light source and lightpipe.

37. The system of claim 31, wherein the color wheel is disposed after both of the light source and lightpipe at the propagation path of the light.

38. The system of claim 32, wherein a color filter is absent from the display system.

* * * * *